W. T. HOOFNAGLE.
REFRIGERATING APPARATUS.
APPLICATION FILED AUG. 6, 1915.

1,230,483.

Patented June 19, 1917
3 SHEETS—SHEET 1.

Inventor
W. T. Hoofnagle
By Walton Boyden
Attorneys

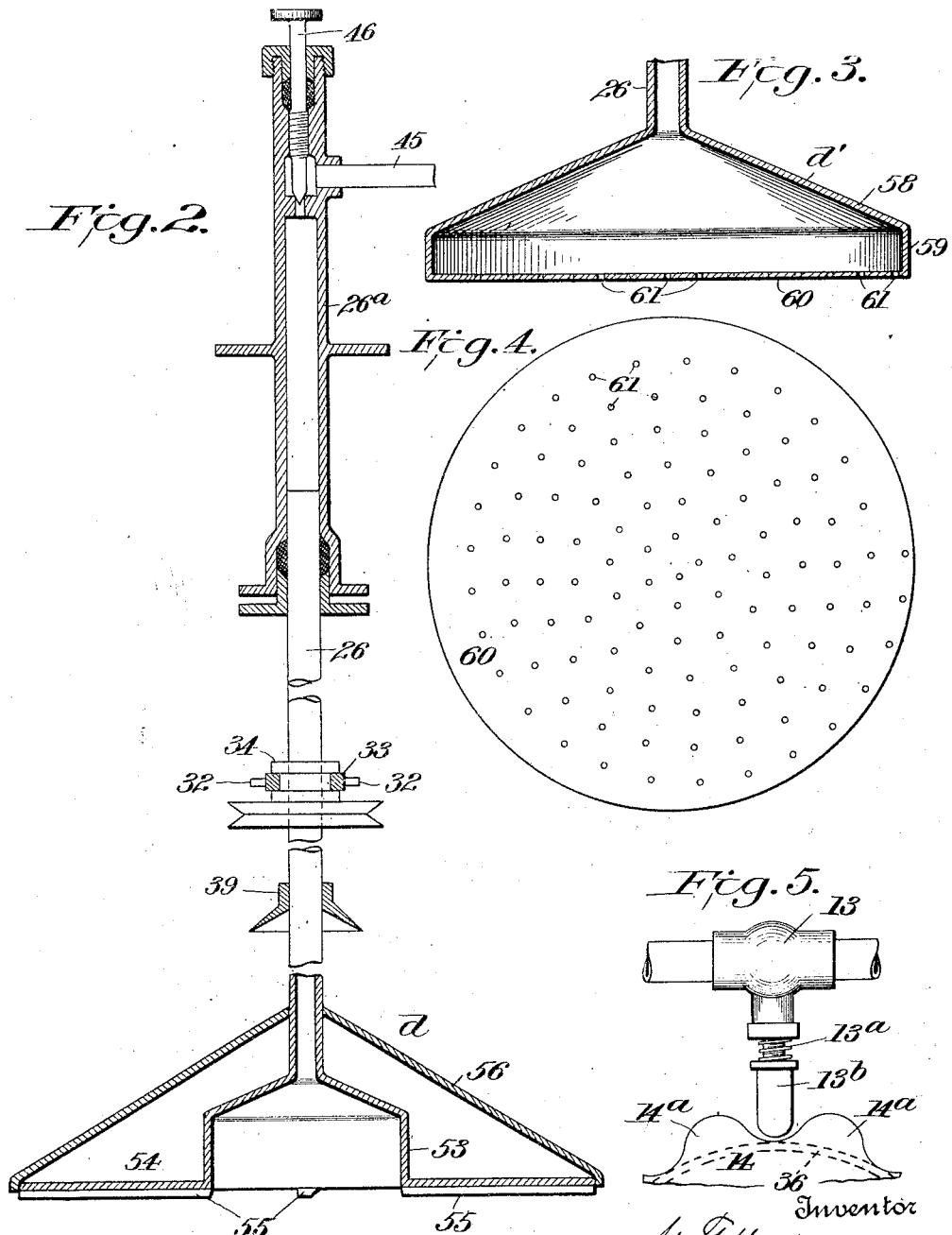

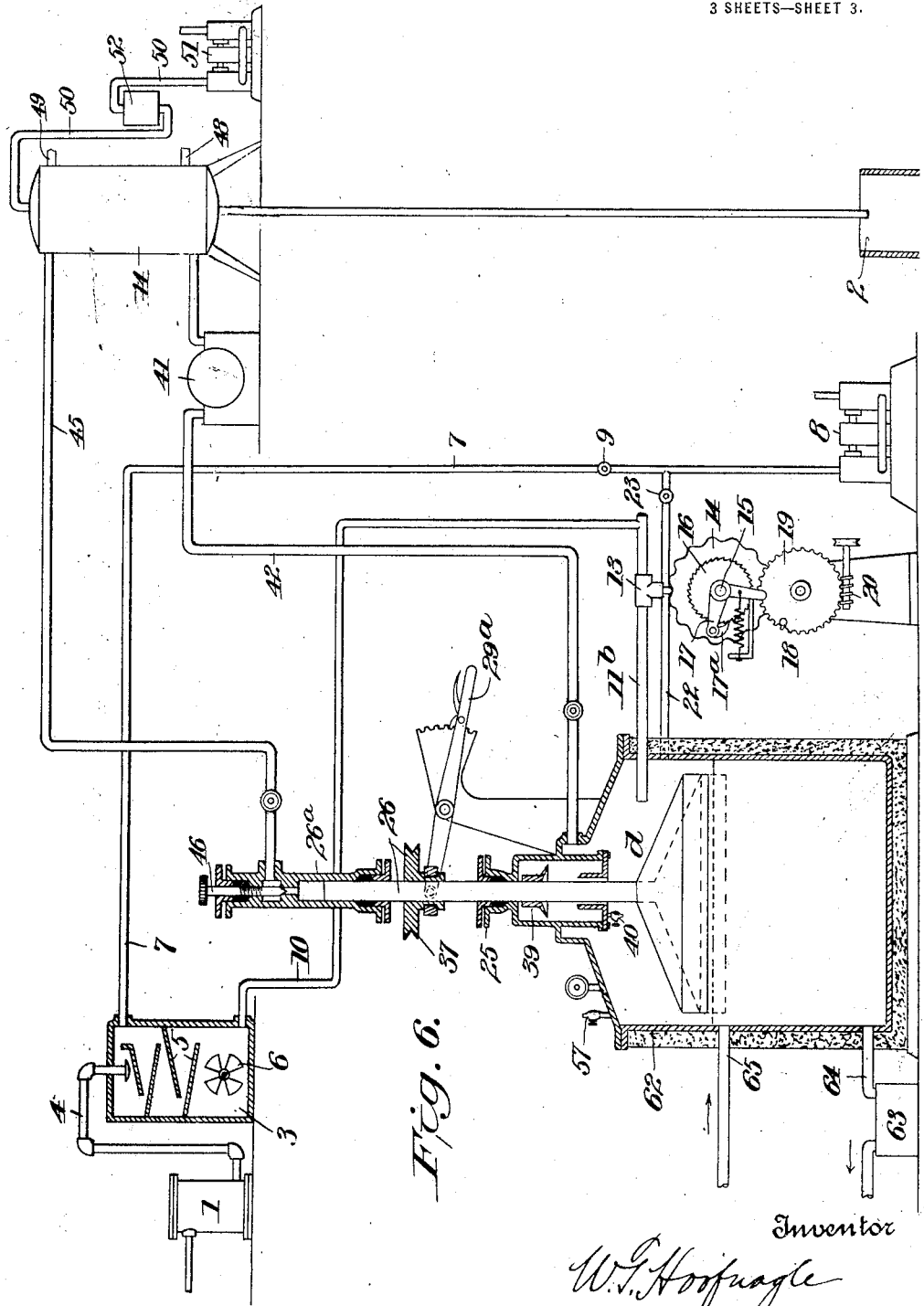

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

REFRIGERATING APPARATUS.

1,230,483.     Specification of Letters Patent.     Patented June 19, 1917.

Application filed August 6, 1915. Serial No. 43,971.

*To all whom it may concern:*

Be it known that I, WILLIAM T. HOOF-NAGLE, a citizen of the United States, residing at Glen Ridge, in the county of Essex and State of New Jersey, have invented certain new and useful Improvements in Refrigerating Apparatus, of which the following is a specification.

In my co-pending application, Serial No. 38,738, filed July 8, 1915, I have described a method and apparatus for cooling aqueous liquids to the freezing point by introducing the liquid into a closed chamber, constantly exhausting the chamber to remove vapor therefrom and causing air to circulate over the surface of the water, whereby it has been found possible to form ice with a higher pressure prevailing in the refrigerating chamber than is required in the usual vacuum process of ice-making, wherein air is excluded as far as possible from the refrigerating chamber. The present invention relates to improvements in apparatus for carrying out the method disclosed in the aforesaid application. It is important, in order to obtain the best results, that the air shall be circulated in close contact with the water and the present invention embodies, among other features, improved means for distributing the air within the cooling chamber and causing it to flow swiftly in close contact with the water, whereby such rapid evaporation takes place that the water is reduced to a freezing temperature while the pressure within the chamber may be above that required for freezing under conditions where the air is excluded. While, in the ordinary vacuum process, where air is excluded, it is necessary to maintain a pressure as low as 4.6 m. m. to freeze water, I have found that by circulating air through the freezing or vacuum chamber and causing the incoming air to flow in close contact with the surface of the water, the water may be frozen with a pressure prevailing in the chamber as high as 30 to 35 m. m. Hence, by my method, the vapors at the point of exit from the chamber are much denser than in the ordinary vacuum system and less power is required to expel the vapors from the chamber.

In the accompanying drawing, which illustrates my invention,

Fig. 2 is a central vertical section through the air pipe and distributer for admitting air to the refrigerating chamber;

Fig. 3 is a vertical section through a modified form of air distributer;

Fig. 4 is a bottom plan view of the air distributer shown in Fig. 3;

Fig. 5 is a detail view showing the cam and valve for controlling the admission of water to the refrigerating chamber; and, Fig. 6 is an elevation, partly in section, of a plant for cooling or refrigerating by the indirect method.

Figure 1:
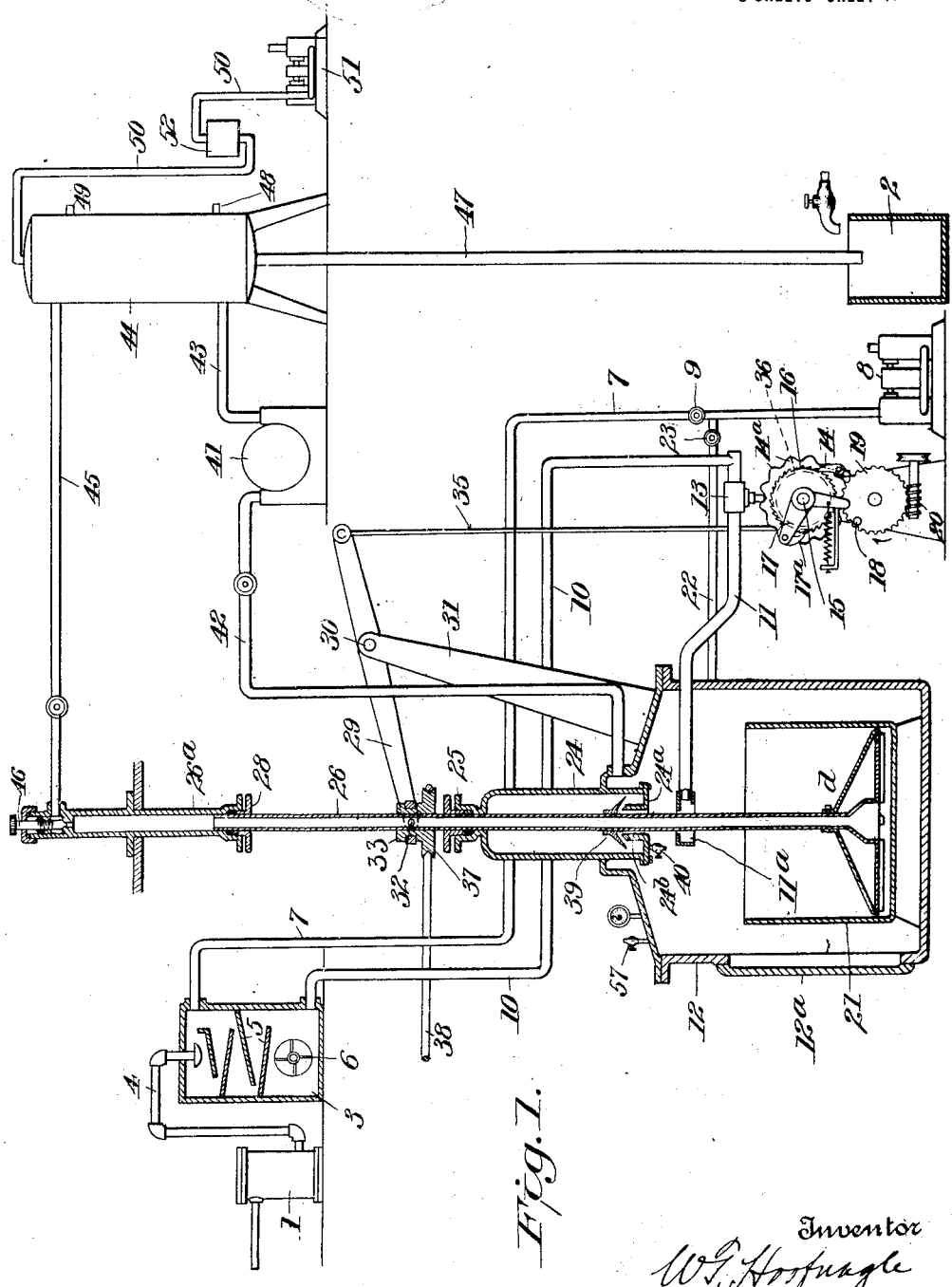
Figure 1 is an elevation, partly in section, of a plant embodying my invention for making ice by the direct method.

Referring to Figs. 1 to 5, inclusive, of the drawing, 1 indicates a pump for delivering distilled water, from a suitable source, preferably the well 2, to a deaerating chamber 3, through a spray pipe 4. The deaerating chamber contains baffles 5 and an agitating device 6, and this chamber is connected by a pipe 7 to an exhaust pump 8. The apparatus thus far described is substantially the same as that illustrated in my prior Patent No. 828,888, and in operation the water flows over the baffles in a thin stream and is agitated in the bottom of the chamber, and most of the air entrained in the water passes off through the pipe 7. The pump 8 is constantly in operation and the valve 9 in the pipe 7 remains partly or wholly open.

The water from the deaerating chamber 3 is allowed to pass at intervals, in regulated quantities, through a pipe 10 to the pipe 11, which extends into a closed freezing chamber 12 and terminates in an annular nozzle 11$^a$. The pipe 11 contains a normally closed valve, indicated at 13, said valve having a spring pressed stem 13$^a$, with an adjustable extension 13$^b$, which is adapted to be engaged and moved, to open the valve, by cam surfaces 14$^a$ on a cam wheel 14, (see Fig. 5). This cam wheel is mounted upon a suitable shaft 15, to which is secured a ratchet wheel 16, and upon the shaft is arranged a bell crank ratchet lever 17, having a pawl 17$^a$ for engaging the teeth of the ratchet wheel. One arm of the ratchet lever projects into the path of movement of a pin 18 on a worm wheel 19, which is driven by a worm 20, connected to a suitable source of power (not shown). The worm wheel turns in the direction of the arrow, Fig. 1, and at each revolution of said wheel the pin 18 engages the ratchet lever and causes the pawl thereon to move the ratchet wheel and cam wheel a distance equal to the length of one of the cams 14ª. The stem of the valve normally rests between two of the cams on the cam wheel, as shown in Fig. 5, and at each movement of the cam wheel, the valve opens and closes, admitting a pre-determined quantity of water to the refrigerating chamber. The amount of water admitted may be regulated by adjusting the part 13ᵇ of the valve stem so as to increase or decrease the total length of the stem and thereby increase or decrease the duration of its engagement with the successive cams.

The refrigerating chamber is provided with an opening in one side through which a freezing can 21 may be inserted and removed, and a door 12ª is provided for hermetically sealing this opening. A pipe 22 connects the refrigerating chamber with the pipe 7 and thence to the exhaust pump 8, and by means of these connections the refrigerating chamber may be preliminarily exhausted after the freezing can is placed within it and the door of the chamber is closed. A valve 23 in the pipe 22 may be opened to connect the freezing chamber with the pump 8, and after said chamber has been exhausted, this valve may be closed or left partially open, according to the conditions prevailing in the refrigerating chamber.

In the central part of the top of the refrigerating chamber is arranged a cylindrical casing 24, in the upper part of which is a stuffing box 25, and a pipe 26 extends through this stuffing box into the refrigerating chamber, this pipe carrying at its lower end an air distributing device d, more particularly described hereinafter. The pipe 26 is movable vertically and is journaled in the stuffing box 25 and a stationary pipe section 26ª, into which it fits telescopically. A stuffing box 28 is arranged within the lower end of the section 26ª and surrounds the pipe 26. The pipe 26 is supported by a lever 29, journaled at 30 upon a supporting arm 31, projecting from the casing of the refrigerating chamber. One arm of the lever 29 has a forked end which is engaged by trunnions 32 on a collar 33, which collar is journaled in a groove in a collar 34, fixed to the pipe 26. The opposite arm of the lever is connected by a cable 35 to a drum 36, operated by a ratchet wheel 16. It will be evident that each time the ratchet wheel is moved to cause the valve 13 to open and admit water to the refrigerating chamber, the shaft 26 and air distributer d will be raised a given distance. The shaft 26 is provided with a driving pulley 37 and, by means of power applied through a belt 38, the shaft and distributer d are rotated during the freezing operation.

The casing 24, surrounding the shaft 26, is provided in order to form an oil-well to receive any oil or grease which may pass downward on said shaft from its bearings, and to prevent this oil and grease from entering the freezing can, where it would not only contaminate the water, but where it would very seriously interfere with the cooling or freezing operation, since it would prevent the evaporation of the water. As shown, the bottom 24ª of the casing 24 has an upwardly turned annular flange 24ᵇ, surrounding the shaft 26, and above this flange and secured to the shaft is a closely fitting bell-shaped collar 39 which projects outwardly beyond the upper edge of said flange and directs any oil which may flow downward on the shaft outwardly into the bottom of the casing 24, thus preventing any oil from entering the freezing can. From the casing 24, which constitutes an oil well, any accumulation of oil may be withdrawn, when the refrigerating chamber is open, through a pet cock 40.

A main exhaust pump 41 has its suction end connected by the pipe 42 to the interior of the refrigerating chamber, and the compression side of the pump is connected by a pipe 43 to a surface condenser 44, from which a return pipe 45 extends to the upper end of the pipe section 26ª. In the upper end of the pipe section 26ª is arranged a hand operated valve 46, for regulating the pressure of air flowing from the pipe 45 to the pipe 26. During the operation of the apparatus, the vapors drawn from the refrigerating chamber, and also the air contained therein, pass through the pipes 42 and 43 to the surface condenser where the vapors are condensed, the water of condensation passing through an extended drainage pipe 47 to the well 2, while the air is returned to the refrigerating chamber through the pipes 45 and 26 and the distributer d. The air within the apparatus thus flows in a closed circuit, while the vapors are condensed and removed. The cooling water for the condenser enters through a pipe 48 and leaves the condenser by way of a pipe 49. For removing surplus air from the apparatus, a pipe 50 is connected to the condenser and to a small exhaust pump 51, and in this pipe is arranged a suitable pressure regulating valve 52, adapted to open automatically when the air pressure is greater than necessary for the proper operation of the apparatus.

The distributer d, as shown in Figs. 1 and 2, comprises a hood or funnel-shaped extension 53 on the lower end of the pipe 26, and a flat flange or disk 54, projecting horizontally from the lower edges of the hood. Upon the lower face of this disk are arranged radially extending ribs or vanes 55. The distributer, as shown in Fig. 1, is nearly of the same diameter as the interior of the freezing can. The pipe 11, which admits water to the can, terminates in the annular nozzle 11ᵃ, which latter surrounds the pipe 26, and in order to distribute the water in the freezing can, a conical hood 56, secured to the pipe 26, extends downwardly and outwardly over the parts 53 and 54 of the air distributer. Thus, as a charge of water is admitted through the nozzle 11ᵃ, it falls on the hood 56 and from thence flows quickly down into the can below the air distributer.

In operation, the freezing can is placed within the refrigerating chamber, as shown in Fig. 1, and the pipe 26 is lowered, by releasing the ratchet mechanism until the disk of the air distributer is close to the bottom of the freezing can. When the door of the refrigerating chamber is closed, the chamber is preliminarily exhausted by opening the valve 23 and starting the small pump 8. When the pressure is reduced to about 30 m. m., the valve 23 is closed, or left slightly open. After the chamber has been preliminarily exhausted, the main exhaust pump 41 and the mechanism for operating the valve 13 are started. The valve 13 is opened at timed intervals, allowing small charges of water to enter the freezing chamber and flow to the bottom of the freezing can. As each charge is admitted, the air distributer is moved up one step, thus keeping the lower face of the distributer always above the surface of the water but close to it. The admission of water, and the lifting of the air distributer, it will be understood, will be timed so that these operations will take place only as fast as the successive charges of water can be frozen, and thus the ice will be frozen in successive layers, into a solid block, while the air distributer will always be close to the layers of water as they spread out on the ice beneath. The pump 41 is maintained in constant operation and the vapors are withdrawn, along with the air within the refrigerating chamber, and compressed into the surface condenser 44, where the vapors are condensed and passed to the well 2, while the air flows back through the pipes 45 and 26 to the central inverted funnel 53, where the air spreads out and flows radially outward between the disk 54 and the surface of the water, thence passing upward with the vapors to the outlet pipe 42 again. As the pipe 26 and the air distributer are rapidly rotated, the vanes 55 sweep the air over the surface of the water as it passes from the center to the periphery of the disk 54, and thus the air is caused to move swiftly over the water and in close contact with it.

Sufficient air to operate the apparatus remains therein after the preliminary exhaustion of the refrigerating chamber. If more air is desired at any time, it may be admitted through the valve-controlled pipe 57, and if the apparatus contains an excess of air, while in operation, it may be removed by the pump 51, through the pressure regulating valve 52, which opens in response to an increase in air pressure, above a predetermined amount. The velocity of the air over the surface of the water may be regulated to some extent by adjusting the valve 46, to more or less restrict the passageway between the pipe 45 and the pipe 26 leading to the interior of the refrigerating chamber. By restricting this passageway, the air flowing through the pipe 26 and the air distributer will be expanded and will flow with greater rapidity over the surface of the water.

By circulating the air over and in close proximity to the water, and by exhausting the air and vapors in the manner described, the water can be frozen with a pressure as high as 35 m. m. prevailing in the refrigerating chamber, whereas by the usual vacuum process, where air is excluded as far as practicable, freezing does not take place at a greater pressure than 4.6 m. m. The ability to operate the plant at a pressure much above that required in the usual vacuum process, necessarily results in a large saving in power because less compression is required in expelling the vapors from the apparatus. The air and vapors, it will be understood, are, in the present apparatus, compressed by the pump from a pressure of about 30 to 35 m. m. up to the pressure prevailing in the condenser, say 50 m. m., whereas in the usual vacuum process the compression by the pump is from about 4.6 m. m. to the condenser pressure. It follows also that the apparatus can be operated with exhaust mechanism of smaller capacity than in plants where the lower pressure must exist within the apparatus, as the air and vapor at the higher pressure have much less volume than the vapor alone at the lower pressure.

While the apparatus could be operated with air admitted from the atmosphere and exhausted again to the atmosphere, this would require a much greater expenditure of power than is necessary by the system herein described, where the air is circulated within the apparatus. Experiments have shown that it is immaterial whether the air be moist or dry.

The form of distributer illustrated in Figs. 1 and 2 is the preferred form. This is preferably operated at a comparatively high speed, but even if held stationary, or if the vanes thereon be removed, good results may be attained although not as satisfactory as if constructed and operated in the manner heretofore described.

In Figs. 3 and 4, I have shown a modified form of distributer $d'$, comprising a hollow drum attached to the pipe 26, said drum having a diameter approximately equal to the interior of the diameter of the freezing can and having a conical upper wall 58, which sheds and distributes the water entering through the water inlet nozzle. The drum has a cylindrical flange 59 at its lower end, and secured to the lower end of this flange is a disk 60, having small perforations 61 throughout its area, these perforations preferably being spirally arranged. In the operation of this distributer the disk 60 is located close to the water and the pipe and distributer are rotated, the air flowing through the pipe and into the drum, passing through the perforations, and thence outwardly over the surface of the water and in close contact with it.

In Fig. 6 of the drawing, I have shown the invention as applied to cooling brine for indirect ice-making, or other refrigerating purposes. When used in connection with a brine circulating system it is unnecessary to provide for moving the air distributer upward, step by step, since the level of the brine is maintained practically constant. Therefore, this feature is omitted from Fig. 6 of the drawing; otherwise the apparatus shown in Fig. 6 is largely a duplication of that shown in Fig. 1, and the similar reference letters indicate similar parts in these two figures. In Fig. 6, the cooling or refrigerating chamber 62 comprises a closed tank adapted to hold brine. The brine is circulated by means of a pump 63, through pipes 64 and 65, the brine leaving the tank through the lower pipe 64 and returning through the pipe 65. The air distributer $d$ may be the same as in Fig. 1, and the distributer and pipe 26 are adjustable vertically by a hand lever 29$^a$. The brine is maintained at a constant level by the intermittent flow through the valve 13 in the pipe 11$^b$, and the air distributer is set close to the surface of the brine, as indicated in full lines in Fig. 6.

In operation, the tank 62 is preliminarily exhausted by the exhaust pump 8, and thereafter air and vapors are drawn from the tank by the pump 41, the vapor being condensed and separated from the air in the condenser 44, and the air returning through the pipes 45 and 26, through the distributer to the surface of the water, the continuation of this operation causing very rapid evaporation of water and abstraction of heat from the brine. To compensate for loss of water through evaporation, the valve 13 is intermittently operated to admit water by the valve operating devices.

For cooling brine the air distributer $d$ may be set very close to the brine, as shown in full lines in Fig. 6, and this adjustment gives the best results; but for brine cooling the air distributer may even be immersed in the brine, as indicated in dotted lines in Fig. 6, and with this adjustment the distributer need not be rotated as the air is brought in intimate contact with the brine in flowing radially outward and thence upward around the distributer.

What I claim is:

1. In a vacuum refrigerating apparatus, a closed vessel adapted to contain an aqueous liquid, means for exhausting air and vapor from said vessel, means for conducting air into said vessel, and means for distributing the entering air laterally in said vessel and in close contact with the liquid therein.

2. In a vacuum refrigerating apparatus, a closed vessel adapted to contain an aqueous liquid, means for exhausting air and vapor from said vessel, means for admitting air to said vessel, and means for causing the air to flow parallel and in close contact with the surface of the liquid.

3. In a vacuum refrigerating apparatus, a closed vessel adapted to contain an aqueous liquid, means for exhausting air and vapor from said vessel, means for returning the air to said vessel, and means for causing the air to flow parallel and in close contact with the surface of the liquid.

4. In a vacuum refrigerating apparatus, a closed chamber adapted to contain an aqueous liquid, means for exhausting air and vapors from the chamber, an air distributer having a lower face adapted to extend parallel with the surface of the liquid and close to it, and means for causing a current of air to flow between said face and the liquid.

5. In a vacuum refrigerating apparatus, a closed chamber adapted to contain an aqueous liquid, means for exhausting air and vapors from the chamber, an air distributer having a lower face adapted to extend parallel with the surface of the liquid and close to it, means for rotating said distributer, and means for causing a current of air to flow between said face and the liquid.

6. In a vacuum refrigerating apparatus, a closed chamber adapted to contain an aqueous liquid, means for exhausting air and vapors from the chamber, an air distributer having a lower face adapted to extend parallel with the surface of the liquid and close to it, and having vanes on said face, means for rotating said distributer, and means for causing a current of air to flow between said face and the liquid.

7. In a vacuum refrigerating apparatus, a closed chamber adapted to contain an aqueous liquid, means for exhausting air and vapors from the chamber, an air distributer having a lower face adapted to extend parallel with the surface of the liquid and close to it, and an air pipe leading into said chamber and connected to the central portion of said distributer.

8. In a vacuum refrigerating apparatus, a closed chamber adapted to contain an aqueous liquid, means for exhausting air and vapors from the chamber, an air distributer having a lower face adapted to extend parallel with the surface of the liquid and close to it, said distributer having vanes on said lower face, an air pipe leading into said chamber and connected to the central portion of said distributer, and means for rotating the distributer.

9. In a vacuum refrigerating apparatus, a closed chamber adapted to contain an aqueous liquid, means for exhausting air and vapors from the chamber, an air distributer within the chamber having a substantially flat lower surface, and means for admitting air into said chamber beneath said surface.

10. In a vacuum refrigerating apparatus, a closed chamber adapted to contain an aqueous liquid, means for exhausting air and vapors from the chamber, an air distributer within the chamber having a substantially flat lower surface, means for admitting air into said chamber beneath said surface, and means for adjusting said distributer vertically.

11. In a vacuum refrigerating apparatus, a closed chamber adapted to contain an aqueous liquid, means for exhausting air and vapors from the chamber, an air distributer within the chamber having a substantially flat lower surface, means for admitting air into said chamber beneath said surface, means for adjusting the distributer vertically, and means for rotating the same.

12. In a vacuum refrigerating apparatus, a closed chamber adapted to contain an aqueous liquid, means for exhausting air and vapors from the chamber, an air distributer within the chamber having a substantially flat lower surface, an air pipe leading to the central portion of said distributer, a conical hood surrounding the pipe above said face, and means for admitting water to said chamber above the hood.

13. In a vacuum refrigerating apparatus, a closed chamber adapted to contain an aqueous liquid, an exhaust pump, a surface condenser, a return pipe system leading from said chamber through said pump and condenser to said chamber, and a valve in said system between the condenser and chamber for restricting the air flow.

14. In a vacuum refrigerating apparatus, a closed chamber adapted to contain an aqueous liquid, an exhaust pump, a surface condenser, a return pipe system leading from said chamber through said pump and condenser to said chamber, a pressure regulator and means for exhausting air from said system connected between the compression side of the pump and the return end of said system.

In testimony whereof I have affixed my signature.

WILLIAM T. HOOFNAGLE.